US007308091B1

(12) United States Patent
Smith

(10) Patent No.: US 7,308,091 B1
(45) Date of Patent: Dec. 11, 2007

(54) WEB-BASED DATA MANIPULATION FOR ADVANCED INTELLIGENT NETWORK SERVICE CONTROL POINT SERVICES

(75) Inventor: Benjamin V. Smith, Maylene, AL (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 696 days.

(21) Appl. No.: 10/236,524

(22) Filed: Sep. 6, 2002

(51) Int. Cl.
H04M 3/42 (2006.01)

(52) U.S. Cl. .......................... 379/207.02; 379/201.01; 379/201.02; 379/201.03

(58) Field of Classification Search ........... 379/201.01, 379/207.02, 201.02, 201.03, 201.05; 709/229, 709/202, 203, 219, 224, 225
See application file for complete search history.

(56) References Cited

U.S. PATENT DOCUMENTS

| | | | |
|---|---|---|---|
| 4,278,844 A | | 7/1981 | Jones |
| 5,060,255 A | | 10/1991 | Brown |
| 5,333,180 A | | 7/1994 | Brown et al. |
| 5,438,568 A | | 8/1995 | Weisser, Jr. |
| 5,583,976 A | | 12/1996 | Bullard, Jr. |
| 5,596,627 A | | 1/1997 | Solomon et al. |
| 5,742,905 A | | 4/1998 | Pepe et al. |
| 5,854,835 A | | 12/1998 | Montogmery |
| 5,854,836 A | * | 12/1998 | Nimmagadda ......... 379/221.13 |
| 5,867,498 A | | 2/1999 | Gillman et al. |
| 5,958,016 A | * | 9/1999 | Chang et al. ................ 709/229 |
| 5,999,611 A | * | 12/1999 | Tatchell et al. ........ 379/211.02 |
| 6,009,409 A | | 12/1999 | Adler et al. |
| 6,052,598 A | | 4/2000 | Rudrapatna |
| 6,160,877 A | | 12/2000 | Tatchell et al. |
| 6,161,128 A | | 12/2000 | Smyk |
| 6,188,757 B1 | | 2/2001 | Malik |
| 6,282,281 B1 | | 8/2001 | Low |
| 6,298,122 B1 | | 10/2001 | Home |
| 6,310,939 B1 | | 10/2001 | Varney |
| 6,377,993 B1 | * | 4/2002 | Brandt et al. ................ 709/227 |
| 6,381,316 B2 | * | 4/2002 | Joyce et al. ............. 379/114.2 |
| 6,453,161 B1 | * | 9/2002 | Touati et al. ................ 455/433 |
| 6,532,285 B1 | * | 3/2003 | Tucker et al. .......... 379/207.02 |
| 6,556,997 B1 | | 4/2003 | Levy |
| 6,647,106 B1 | | 11/2003 | Hussain |
| 6,650,902 B1 | | 11/2003 | Richton |
| 6,677,894 B2 | | 1/2004 | Sheynblat |

(Continued)

OTHER PUBLICATIONS

Bell Labs Technology: A "soft handoff for improved service," printed from http://www.bell-labs.com/technology/wireless/soft.html Internet site, accessed on Jun. 19, 2002, 1 page.

(Continued)

Primary Examiner—Rafael Perez-Gutierrez
Assistant Examiner—My X Nguyen
(74) Attorney, Agent, or Firm—Withers & Keys, LLC

(57) ABSTRACT

Systems and techniques for managing multiple call processing services by establishing a connection to a service control point; rendering a call management profile maintained by the service control point in substantially real time using a Web-enabled interface, the call management profile indicating two or more call processing services currently available to a customer; manipulating the call management profile by specifying at least one of a sequence for prioritizing the call processing services and schedule for providing the call processing services at different times.

10 Claims, 6 Drawing Sheets

U.S. PATENT DOCUMENTS

| | | | |
|---|---|---|---|
| 6,741,188 B1 | 5/2004 | Miller | |
| 6,785,551 B1 | 8/2004 | Richard | |
| 6,823,056 B1 * | 11/2004 | Hussain | 379/207.02 |
| 6,888,929 B1 | 5/2005 | Saylor et al. | |
| 2001/0036258 A1 | 11/2001 | Sugla | |
| 2001/0046280 A1 | 11/2001 | Crockett | |
| 2002/0085698 A1 | 7/2002 | Liebenow | |
| 2002/0126708 A1 | 9/2002 | Skog | |
| 2002/0150227 A1* | 10/2002 | Abraham | 379/218.02 |
| 2003/0043983 A1 | 3/2003 | Pelletier | |
| 2003/0108174 A1* | 6/2003 | Tucker et al. | 379/207.02 |
| 2004/0246147 A1 | 12/2004 | von Grabe | |

OTHER PUBLICATIONS

"Bell Labs Technology: Customers want more data services," printed from http://www.bell-labs.com/technology/wireless/customerswantdata.html Internet site, accessed on Jun. 19, 2002, 1 page.

"Bell Labs Technology: Early mobile telephone service," printed from http://www.bell-labs.com/technology/wireless/earlyservice.html Internet site, accessed on Jun. 19, 2002, 2 pages.

"Bell Labs Technology: Focusing on wireless transmission—everywhere," printed from http://www.bell-labs.com/technology/wireless/everywhere.html Internet site, accessed on Jun. 19, 2002, 1 page.

"Bell Labs Technology: How do I receive a moble call?" printed from http://www.bell-labs.com/technology/wireless/receive.html Internet site, accessed on Jun. 19, 2002, 1 page.

"Bell Labs Technology: How does a mobile call reach its destination?" printed from http://www.bell-labs.com/technology/wireless/destination.html Internet site, accessed on Jun. 19, 2002, 2 pages.

"Bell Labs Technology: How is a mobile system designed?" printed from http://www.bell-labs.com/technology/wireless/design.html Internet site, accessed on Jun. 19, 2002, 1 page.

"Bell Labs Technology: How is Lucent fueling the Untethered Revolution?" printed from http://www.bell-labs.com/technology/wireless/fueling.html Internet site, accessed on Jun. 19, 2002, 1 page.

"Bell Labs Technology: Let's make a mobile phone call," printed from http://www.bell-labs.com/technology/wireless/call.html Internet site, accessed on Jun. 19, 2002, 1 page.

"Bell Labs Technology: Lucent's support of international standards," printed from http://www.bell-labs.com/technology/wireless/lucent.html Internet site, accessed on Jun. 19, 2002, 1 page.

"Bell Labs Technology: Mobile wireless means wireless access," printed from http://www.bell-labs.com/technology/wireless/mobileaccss.html Internet site, accessed on Jun. 19, 2002, 2 pages.

"Bell Labs Technology: Pinpointing your location," printed from http://www.bell-labs.com/technology/wireless/pinpoint.html Internet site, accessed on Jun. 19, 2002, 1 page.

"Bell Labs Technology: Slicing up the cellular pie," printed from http://www.bell-labs.com/technology/wireless/pie.html Internet site, accessed on Jun. 19, 2002. 1 page.

"Bell Labs Technology: Switching a mobile call at 55 miles per hour," printed from http://www.bell-labs.com/technology/wireless/switching.html Internet site, accessed on Jun. 19, 2002, 2 pages.

"Bell Labs Technology: There are some limits on wireless data transmission," printed from http://www.bell-labs.com/technology/wireless/limitsondata.html Internet site, accessed on Jun. 19, 2002, 1 page.

"Bell Labs Technology: Too many technological standards," printed from http://www.bell-labs.com/technology/wireless/standards.html Internet site, accessed on Jun. 19, 2002, 1 page.

"Bell Labs Technology: Understanding Wireless Mobile Communications," printed from http://www.bell-labs.com/technology/wireless/ Internet site, accessed on Jun. 19. 2002, 2 pages.

"Bell Labs Technology: What if I've moved out of my service provider's area?" printed from http://www.bell-labs.com/technology/wireless/moved.html Internet site, accessed on Jun. 19, 2002, 1 page.

"Bell Labs Technology: What is a 'cell'?" printed from http://www.bell-labs.com/technology/wireless/cell.html Internet site, accessed on Jun. 19. 2002, 2 pages.

"Bell Labs Technology: What's hot today? Wireless data!" printed from http://www.bell-labs.com/technology/wireless/hotdata.html Internet site, accessed on Jun. 19, 2002, 1 page.

"Bell Labs Technology: What's the difference between 'cellular' and 'PCS'?" printed from http://www.bell-labs.com/technology/wireless/difference.html Internet site, accessed on Jun. 19, 2002, 1 page.

"Cingular Wireless Selects TruePosition® as Location Technology Provider for its Nationwide Wireless Network," printed from http://www.trueposition.com/news_cingular.html Internet site, accessed on Nov. 11, 2001, 2 pages.

"HeyAnita—Engaging your world through voice," printed from http://wwwheyanita.com/Technology/t_products.asp Internet site, accessed on Jun. 10, 2002, 4 pages.

"Home Toys Article," printed from http://www.hometoys.com/htinews/oct99/articles/panja/panja.htm Internet site, accessed on Jun. 10, 2002, 3 pages.

"How 911 works," printed from http://contact.bellsouth.com/email/bbs/phase2/how911works.html Internet site, accessed on Jun. 19, 2002, 6 pages.

"IEC: Wireless Intelligent Network (WIN)," printed from http://www.iec.org/online/tutorials/win/topic01.html?Back..x=17&Back.y=14 Internet site, accessed on Aug. 6, 2002, 3 pages.

"IEC: Wireless Intelligent Network (WIN)," printed from http://www.iec.org/online/tutorials/win/topic02.html?Next.x=38&Next.y=13 Internet site, accessed on Aug. 6, 2002, 3 pages.

"IEC: Wireless Intelligent Network (WIN)," printed from http://www.iec.org/online/tutorials/win/topic03.html?Next.x=35&Next.y=14 Internet site, accessed on Aug. 6, 2002, 3 pages.

"IEC: Wireless Intelligent Network (WIN)," printed from http://www.iec.org/online/tutorials/win/topic04.html?Next.x=37&Next,y=17 Internet site, accessed on Aug. 6, 2002, 2 pages.

"IEC: Wireless Intelligent Network (WIN)," printed from http://www.iec.org/online/tutorials/win/topic0.5.html?Next.x=36&Next.y=13 Internet site, accessed on Aug. 6, 2002, 2 pages.

"Position Location Solutions," printed from www.cdmatech.com/solution/pdf/positionlocation.pdf Internet site, accessed on Jun. 10, 2002, 4 pages.

"SF Bay Traffic.info," printed from http://www.sfbaytraffic.info/aboutus.htm Internet site, accessed on Jun. 10, 2002, 2 pages.

"SMS Services," printed from http://www.cointel.co.za/smsservicesframe.htm Internet site, accessed on Jun. 10, 2002, 6 pages.

"Strategis: Press Resources," printed from http://www.strategisgroup.com/press/findings.asp?ObjectId=48624&HomePage=True Internet site, accessed on Jun. 10, 2002, 8 pages.

"TrafficMode.Com," printed from http://www.trafficmode.com/page714214.htm Internet site, accessed on Jun. 10, 2002, 3 pages.

Wang, Jin, et al., "Wireless Voice-over-IP and Implications for Third-Generation Network Design," Bell Labs Technical Journal, Jul.-Sep. 1998, pp. 79-97.

U.S. Appl. No. 10/217,283, filed Aug. 12, 2002.

U.S. Appl. No. 10/236,489, filed Sep. 6, 2002.

U.S. Appl. No. 10/237,486, filed Sep. 9, 2002.

U.S. Appl. No. 10/237,346, filed Sep. 9, 2002.

U.S. Appl. No. 10/447,030, filed May 28, 2003.

* cited by examiner

WEB-BASED DATA MANIPULATION FOR ADVANCED INTELLIGENT NETWORK SERVICE CONTROL POINT SERVICES

TECHNICAL FIELD

The present invention relates generally to a communications system and, more particularly, to a communications system for providing customers with the ability to manage multiple call processing services.

BACKGROUND

Increased competition has challenged telecommunications service providers to continuously offer new and improved services to customers. Fortunately, certain advancements in technology have enabled telecommunications service providers to keep pace with the increasing demands of customers. For example, the integration of an Advanced Intelligent Network (AIN) with a public switched telephone network (PSTN) has allowed Local Exchange Carriers (LECs) to provide customers with a variety of enhanced call processing features and telecommunications services beyond those enabled by conventional switching circuits of the PSTN.

Providing enhanced AIN features and services has long been a growing market for telecommunications providers. However, constantly offering new services and features may have a tendency to overwhelm telecommunications customers at times. For example, if upgrading to a new service is burdensome, a telecommunications customer may decide to keep an existing service rather than go through the difficulties of choosing among new services or dealing with complicated upgrading procedures. Accordingly, there exists a need for a user-friendly manner for customers to easily and efficiently manage telecommunications services and features.

Moreover, while the introduction of a new service brings revenue potential, it also brings the potential risk of displacing an existing service that may be an important source of revenue for the telecommunications provider. This risk is due to the unwillingness of customers to pay for multiple services and, in large part, to the inherent limitations of existing AINs. In particular, AINs typically communicate using triggers that define a set of services available to telecommunications customers—that is, each trigger defines a service associated with a particular customer. For example, a termination attempt trigger (TAT) may define a certain service (e.g., call forwarding) to employ for calls terminating at a customer's premises. Such triggers (e.g., TATs), however, are limited on a per-line basis. Namely, each type of trigger is limited to defining only one service available to a particular subscriber. Therefore, AINs typically require an old service to be canceled before a new service can be installed on a customer's line.

Consequently, telecommunications providers are faced with a dilemma when introducing a new service if the new service may cause or force customers to abandon a lucrative existing service. Namely, from a business standpoint, the potential loss in revenue may overshadow the potential benefits of offering the new service. It would be advantageous for telecommunications providers and telecommunications customers alike to enable a new service to be added while keeping an existing service. Accordingly, there exists a need for a manner of allowing multiple services per trigger type.

SUMMARY

In one general aspect, call processing services are managed by establishing a connection to a service control point; rendering a call management profile maintained by the service control point in substantially real time using a Web-enabled interface, the call management profile indicating two or more call processing services currently available to a customer; and manipulating the call management profile by specifying at least one of a sequence for prioritizing the call processing services and schedule for providing the call processing services at different times.

Implementations may include one or more of the following features. For example, the connection may be established over a TCP/IP link, over a wide area network (e.g., Internet, Central Office Wide Area Network), through a gateway, and/or to a service control point. The Web-enabled interface may include a personal computer, browsing software, and/or a wireless telecommunications device.

Rendering the call management profile may involve viewing a Web page. The call management profile may indicate services such as, for example, a call forwarding service, a caller identification service, a call screening and blocking service, a privacy service, a do not disturb service, a remote event notification service, a call waiting service, and an Internet call waiting service. Manipulating the call management profile may involve inputting browser commands.

In another general aspect, multiple call processing services are managed by establishing a connection to a service control point; rendering a call management profile maintained by the service control point in substantially real time using a voice-enabled interface, the call management profile indicating two or more call processing services currently available to a customer; and manipulating the call management profile by specifying a schedule for providing the call processing services at different times.

Implementations may include one or more of the following features. For example, the connection may be through a dedicated service switch point, through a dedicated signal transfer point, and/or by dialing an administration telephone number. The voice-enabled interface may include a wireless telecommunications device and/or a landline telecommunications device.

Rendering the call management profile may involve listening to audio data. Manipulating the call management profile may involve inputting at least one of voice commands and dialing commands.

Aspects of the present invention may be implemented by an apparatus and/or by a computer program stored on a computer readable medium. The computer readable medium may include a disk, a device, and/or a propagated signal.

Other features and advantages will be apparent from the following description, including the drawings, and from the claims.

DETAILED DESCRIPTION

Figure 1:
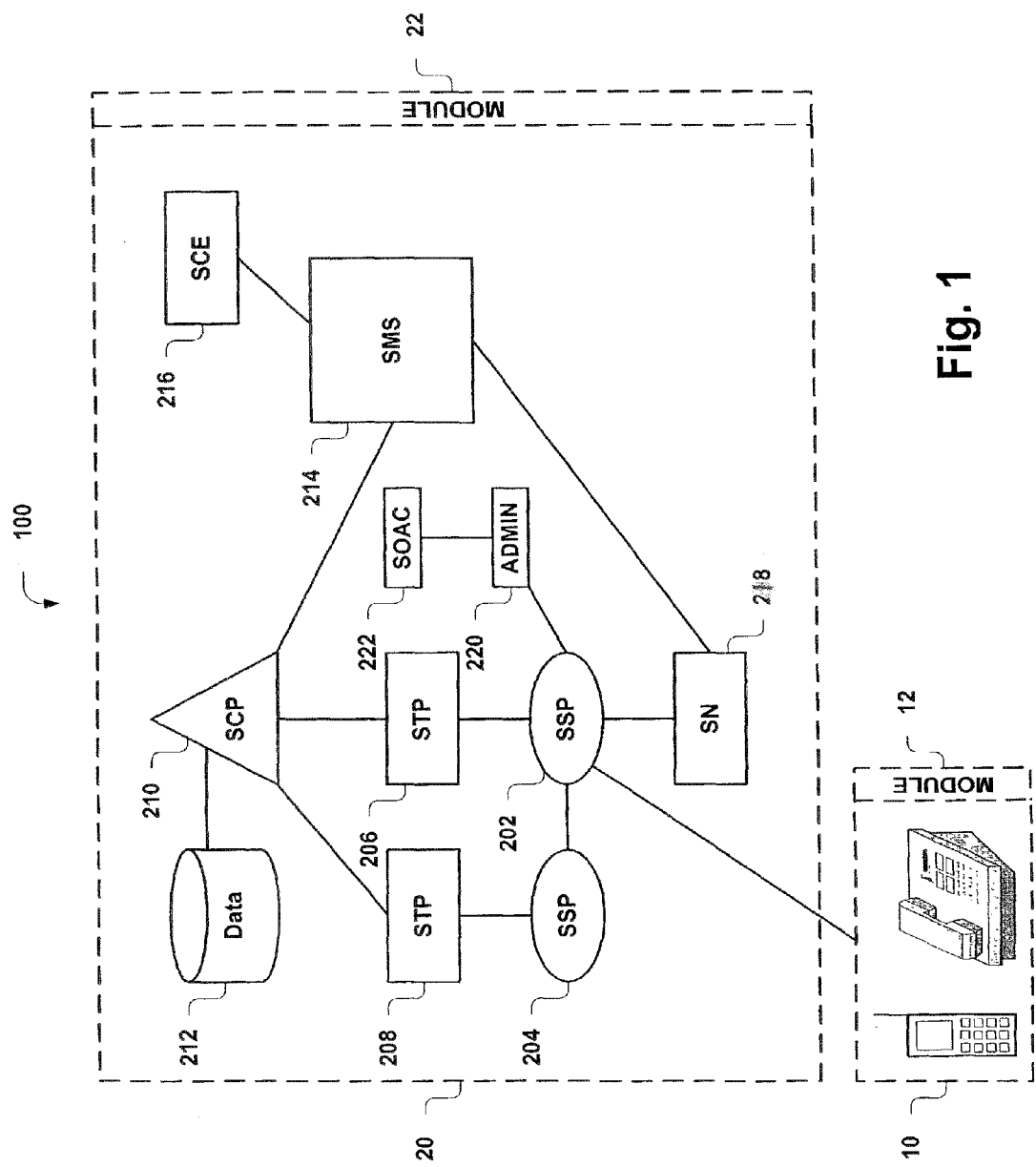
FIG. 1 illustrates one embodiment of a communications system according to aspects of the present invention.

FIG. 1 illustrates one embodiment a communications system 100 according to aspects of the present invention. As shown, the communications system 100 includes a client 10 connected to an Advanced Intelligent Network (AIN) 20. In general, client 10 may be associated with a particular telecommunications customer (i.e., end-user) and configured to access telecommunications services provided the AIN 20. In some implementations, the AIN 20 may be integrated with a public switched telephone network (PSTN) and utilized by a Local Exchange Carrier (LEC) to provide call processing features and telecommunications services that are not embedded within conventional switching circuits of the PSTN.

The client 10 and the AIN 20 generally include hardware and/or software components for communicating through wired and/or wireless communication pathways. The client 10 and the AIN 20 may be structured and arranged to communicate using various communication protocols (e.g., SS7, TCP/IP, BRI/PRI, X.25, HTTP, WAP) to establish connections between elements and/or to operate within or in concert with one or more other systems (e.g., PSTN, the Internet, and/or the World Wide Web).

As shown, the client 10 and the AIN 20 each include one or more devices operating under the direction of an associated control module, i.e., a client module 12 and an AIN module 22. The broken lines are intended to indicate that in some cases, the control module (e.g., client module 12 and/or AIN module 22), or portions thereof considered collectively, may instruct one or more elements of the associated systems (e.g., client 10 and/or AIN 20) to operate as described.

One example of a control module is a software application (e.g., operating system, browser application, micro-browser application, server application, proxy application, gateway application, tunneling application, ISP application, and/or other communication application) loaded on one or more devices that commands and directs the communications. Other examples include a computer program, a piece of code, an instruction, another device, or some combination thereof. The control module may be implemented as software code utilizing any suitable computer language (e.g., Java, Perl, C or C++) using object-oriented techniques, for example. The control module also may be a computer, such as a workstation or PC, a microprocessor, a network server, a Java virtual machine, or an application specific integrated circuit, using any suitable type of computer instructions.

A control module (e.g., client module 12 and/or AIN module 22) may be embodied permanently or temporarily in any type of machine, component, physical or virtual equipment, storage medium, or propagated signal capable of providing instructions to a device. In particular, the control module (e.g., software application, computer program) may be stored on a storage media or device (e.g., ROM, magnetic diskette, or propagated signal) readable by a general or special purpose computer system, such that if the storage media or device is read by the computer system, the functions described herein are performed.

As depicted in the embodiment of FIG. 1, the client 10 may include a device such as a wireless telephone and/or a landline telephone for communicating with the AIN 20. In other embodiments, the client 10 may include, for example, a personal computer (PC), a workstation, a laptop, a facsimile (fax) machine, a laptop, an Internet-enabled personal digital assistant (PDA), an Internet-enabled mobile telephone, an interactive pager, a network server, a modem, a processor, a private branch exchange (PBX) switching system, and/or any other terminating piece of customer equipment capable of accessing the AIN 20. In general, the network devices of the AIN 20 may include any type of computer, server, component, machine, tool, equipment, and/or combination thereof capable of operating as described below.

In one embodiment, the AIN 20 includes several Service Switching Points (SSP) switches 202, 204. For brevity, only two SSP switches are depicted (i.e., a first SSP switch 202 and a second SSP switch 204). It is to be understood, however, that the AIN 20 may include a large number of SSP switches depending on the requirements of a particular LEC, for example.

In general, each SSP 202, 204 functions as an interface between telecommunications customers and the AIN 20. In some implementations, each of the SSP switches 202, 204 may include or form part of a central office (CO) switch of a LEC. Each SSP switch 202, 204 may include transmitters, receivers, and switching devices for providing either digital or analog telephone service and for performing switching functions to permit communication between telecommunications customers. The SSP switches 202, 204 also may perform various communications functions such as user identification, subscription verification, location detection, mobile tracking, call processing, call routing, and/or other signaling functions necessary to control calls to and from other telecommunications and data systems.

In one embodiment, the client 10 may communicate with a first SSP switch 202 over a wired and/or wireless communication link. For example, the client 10 (e.g., a landline telephone) may communicate with the first SSP switch over a subscriber line such as, for example, a twisted pair loop circuit connected between the telephone drop for a telecommunications customer premises and the SSP switch 202 or a trunk circuit (e.g., T-1 trunk circuit) interconnecting the telecommunications customer premises and SSP switch 202.

The client 10 (e.g., wireless telephone) also may communicate with the first SSP 202 over a radio communications link according to an air-interface communications scheme (e.g., CDMA, TDMA, or GSM). In some implementations, the wireless communication link may include a wireless network including, for example, a Mobile Switching Center (MSC), a base transceiver station (BTS), and/or a tandem office. The client 10 (e.g., wireless telephone) may communicate with the BTS over a radio communications link. The BTS may, in turn, communicate with the MSC through an SS7 switching trunk network or an ISDN, for example. The MSC then may communicate with the first SSP switch 202 of the AIN 20 through the tandem office.

As illustrated in FIG. 1, the first SSP switch 202 may be connected to a first signal transfer point (STP) 206 and the second SSP switch 204 may be connected to a second STP 208. The SSPs 202, 204 and the STPs 206, 208 may communicate using a switching protocol (e.g., the SS7 switching protocol). In general, each STP 206, 208 may include a multi-port, high-speed packet switch configured to respond to the routing information in the appropriate layer of the switching protocol (e.g., the SS7 switching protocol), and route the data packets to an intended destination.

One intended destination of data packets from the STPs 206, 208 may be a service control point (SCP) 210. The STPs 206, 208 may communicate with the SCP 210 using a switching protocol (e.g., the SS7 switching protocol). The SCP 210 may include one or more intelligent servers and may be associated with one or more databases 212 configured to store network data. The intelligent functionality of the SCP 210 may be implemented by programs, such as one or more Service Program Applications (SPAs) running on the SCP 210.

In some implementations, the SCP 210 may be configured by a SPA, for example, to perform high volume routing services, such as call forwarding and 800 number translation and routing. The SCP 210 also may perform routing and servicing of calls among different LECs. Additionally, the SCP 210 may be used for maintenance of and providing access to the database 212 for authorization of billing, such as credit card validations.

Another of the functions of the SCP 210 may be implementing enhanced call services and/features associated with a particular subscriber. The SCP 210 may perform this function in conjunction with the associated database 212, which may store subscriber information. In some implementations, information for a particular subscriber may be stored as a subscriber call management profile identifying certain enhanced calling services and/or features. Such enhanced calling services and/or features may include, but are not limited to, flexible call forwarding (FCF), caller identification (caller ID), call screening and blocking for both incoming and outgoing calls, privacy director (PD), do not disturb (DND), remote event notification, call waiting, Internet call waiting (ICW), and/or any other type of call processing service and/or feature.

According to one embodiment, the database 212 maintains subscriber call management profiles, and the SCP 210 maintains call-processing logic for accessing the call management profiles through the intelligent server. In some cases, the intelligent server maybe configured to generate an interface document containing a subscriber call management profile in real-time each time access to the profile is sought. The intelligent server may generate the interface document according to different formats depending on the mode of access.

In general, the AIN 20 may be configured to provide telecommunications services to customers in response to a query generated from a trigger. In one implementation, the SSP switch 202 may implement a set of triggers for processing calls. The set of triggers may include originating triggers for processing calls originating from a customer premises and terminating triggers for processing calls terminating at a customer premises. For example, the SSP 202 may receive an incoming call to a particular number and implement a terminating trigger associated with the called party. The SSP 202 also may receive an outgoing call from a particular number and implement an originating trigger associated with the calling party.

The trigger causes the SSP 202 to generate a message in the form of a query that is to be sent to an appropriate destination. The query may be formatted, for example, according to SS7 TCAP (Transaction Capabilities Application Part) formats. The query typically may be a data packet including an origination point code and a destination point code. For instance, the origination point code may identify a particular customer (i.e., calling party) by the telephone number of the wireless and/or landline telephone used to place a call, and the destination point code may identify a particular customer (i.e., called party) by the telephone number that was dialed.

The query may be sent from the first SSP 202 through the STP 206 to the SCP 210. The SCP 210 may receive the query and, in turn, may interrogate the database 212 to determine whether customized call features and/or enhanced service should be implemented for the particular call based on the subscriber call management profiles of the calling and/or called party. The results of the database inquiry are sent back as a return packet from SCP 210 to the SSP switch 202 through the second STP 208. The return packet may be formatted according to SS7 TCAP formats including instructions for how the SSP switch 202 is to process the call.

In some cases, the SSP 202 may be instructed to implement one or more enhanced calling features according to aspects of the present invention. In other cases, the return instructions from the SCP 210 may indicate that there is no entry in the database 212 and that conventional telephone service should be provided for the call.

The AIN 20 further includes a Service Management System (SMS) 214 in communication with one or more SCPs (e.g., SCP 210). In one embodiment, the SMS 214 communicates with the SCP 210 through a communication link using a communication protocol, such as, for example, the X.25 communications protocol. In general, the SMS 214 may coordinate operations and provide management support including data management, service management, and/or reporting capabilities for one or more SCPs.

The SMS 214 also may be associated with a Service Creation Environment (SCE) 216. In general, the SCE may enable the implementation of customized services. The SCE 216 may operate in conjunction with the SMS 214 to make such customized services available to one or more SCPs (e.g., SCP 210).

The AIN 20 illustrated in FIG. 1 also may include a service node (SN) 218. The SN 218 may be connected to one or more of the SSP switches (e.g., the first SSP switch 202) through a communications link such as, for example, an Integrated Service Digital Network (ISDN) or a T-1 switching trunk circuit. The SN 218 may include an intelligent server and/or any other AIN-compliant resource, for example an AIN/IP (Intelligent Peripheral).

In general, the SN 218 may perform functions similar to those of the SCP 210. Additionally, the SN 218 may include voice and DTMF signal recognition devices and/or voice synthesis devices. The SN 218 may be used, for instance, to provide an enhanced feature or service requiring an audio connection (e.g., voice dialing, fax services) or to transfer a significant amount of data to a subscriber over a switched connection during or following a call.

In some implementations, the SN 218 may map a call to an audio-based interface document including a subscriber call management profile. To permit a subscriber to access the audio-based interface document, the SN may include an audio-based interface interpreter having text-to-speech (TTS) translation and Automatic Speech Recognition (ASR) capabilities. The interpreter may convert the interface document to a voice format (e.g., VoiceXML) such that the parameters of the subscriber call management profile may be rendered to the client 10 (e.g., mobile telephone and/or landline telephone) using the TTS capabilities of the interpreter.

The ASR functionality of the interpreter may permit recognition of certain keywords spoken by a user of the client 10 as commands to perform certain tasks. For example, the interpreter may be programmed to recognize certain keywords as commands to activate or deactivate certain features, or to otherwise modify a subscriber call management profile. In addition, other keywords may be recognized by the interpreter as a command to browse the document.

In addition, to facilitate interfacing with the audio-based interface document, the SN 218 also may include a DTMF decoder. The DTMF decoder may be programmed to recognize the dialing of certain digits or characters of, for example, a touch-tone telephone, as commands to modify or browse the profile contained in the interface document. For example, characters of a touch-tone telephone may be used to activate or deactivate certain enhanced calling features. In addition, when the subscriber desires to place a call while the call management profile is being rendered to the subscriber, the DTMF decoder may be programmed to recognize a string of digits as a subscriber request to place a call. The first SSP switch 202 then may provide normal call processing to complete the call.

The AIN 20 of FIG. 1 also may include an Administration (ADMIN) server 220 and a Service Order Analysis Controller (SOAC) 222 for maintaining the reliability of the AIN 20. In one implementation, the first SSP 202 is configured to receive customer service requests from the client 10. The customer service requests may identify a problem experienced by a customer associated with the client 10. After receiving the customer service request, the SSP 202 may direct the customer service requests to the ADMIN server 220 for handling. The first SSP 202 may communicate with the ADMIN server 220 using a SS7 switching protocol, for example.

The ADMIN server 220 may detect the type of service request and then route the customer service request to an appropriate SOAC 222 for analysis. The ADMIN server 220 and the SOAC 222 also may communicate using X.25 and/or TCP/IP protocols, for example. The SOAC 222 may receive the customer service request and then may perform testing and analysis to determine a root cause of the problem identified by the customer associated with the client 10. After formulating a solution to the problem, the SOAC 222 may implement appropriate measures to respond to the customer service request and correct the problem experienced by the customer.

Other implementations of the AIN 20 depicted in FIG. 1 may include additional network elements. For example, each of the STPs 206, 208 and the SCP 210 may be provided as a mated redundant pair for enhancing network reliability. In addition, the AIN 20 may include one or more SESS Network Access Points (NAPs) in communication with each of the STPs 206, 208 for detecting network conditions.

Figure 2:
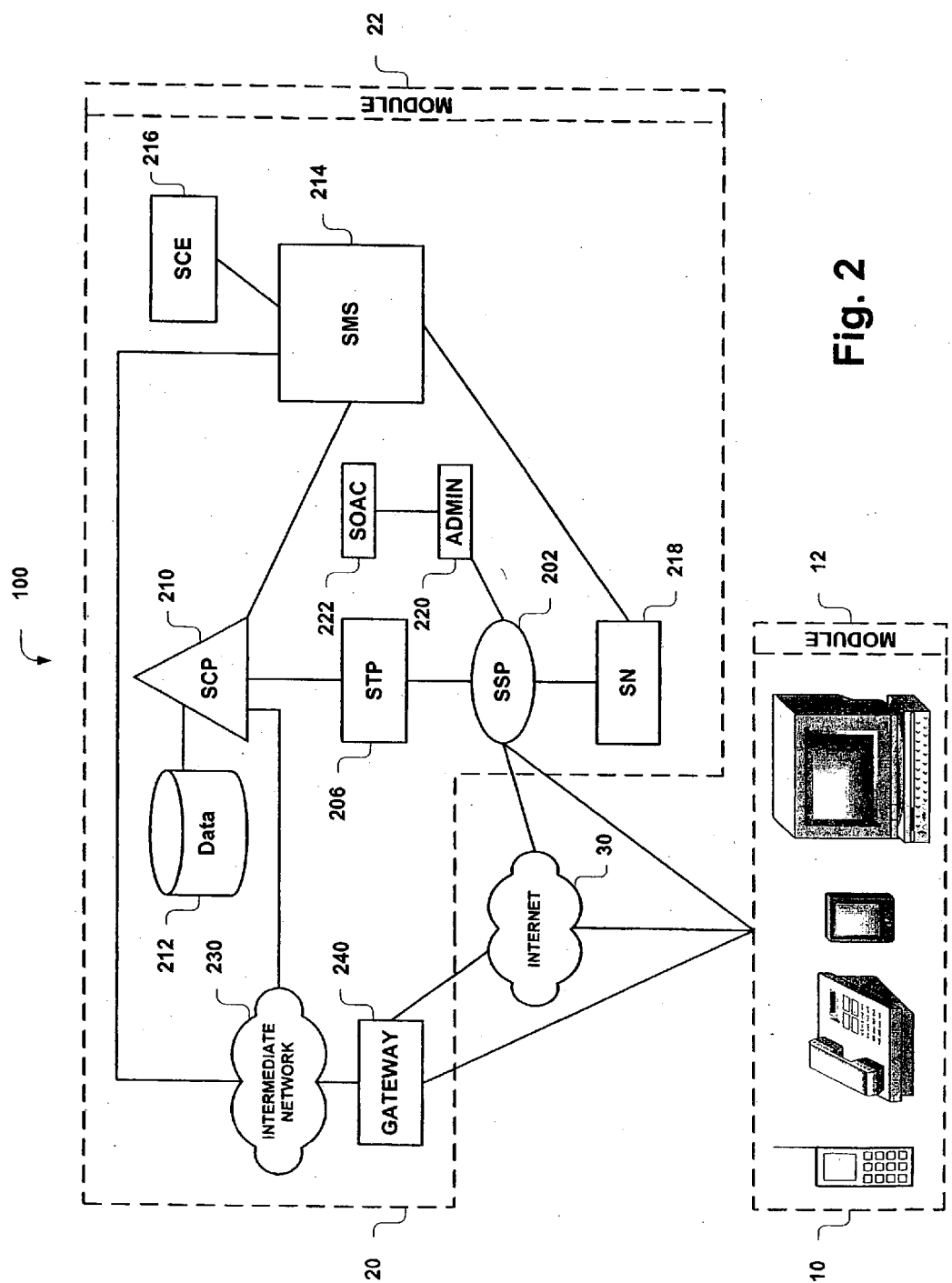
FIG. 2 illustrates one embodiment of a communications system according to aspects of the present invention.

FIG. 2 illustrates another embodiment of a communications system 100. As shown, the communications system 100 includes a client 10 connected to an Advanced Intelligent Network (AIN) 20 and the Internet 30. As shown, the client 10 and the AIN 20 each include one or more devices operating under the direction of an associated control module, i.e., a client module 12 and an AIN module 22. The broken lines are intended to indicate that in some cases, the control module (e.g., client module 12 and/or AIN module 22), or portions thereof considered collectively, may instruct one or more elements of the associated systems (e.g., client 10 and/or AIN 20) to operate as described. The client 10 and/or the AIN 20 may communicate with the Internet 30 through TCP/IP or WAP communications links, for example. For security purposes, firewalls may be provided between the Internet 30 and other elements of the communications system 100.

Information on the Internet 30 may be represented by specially formatted text files (e.g., Web pages) written in Hypertext Markup Language (HTML) or some other markup language, such as XML, HDML, and/or VRML. Each text file may be identified by a network address such as a Universal Resource Locator (URL). A typical Web page may include one or more hyperlinks referring to the network addresses of other Web pages. Hyperlinks may be displayed as underlined text or graphical images that when clicked, send a request for the associated page. For example, when a hyperlink in a home page is selected, a request is sent out by the client to the address specified in the hyperlink, and the associated Web page is downloaded and displayed, replacing the home page on the user's screen with the associated Web page.

In general, the client 10 may be associated with a particular telecommunications customer (i.e., end-user) and configured to access telecommunications services provided by the AIN 20. As depicted in the embodiment of FIG. 2, the client 10 may include a device such as an Internet-enabled mobile telephone, a landline telephone, an Internet-enabled personal digital assistant (PDA), and/or a personal computer (PC) for communicating with the AIN 20. In other embodiments, the client 10 may include, for example, a workstation, a laptop, a facsimile (fax) machine, an interactive pager, a network server, a modem, a processor, a private branch exchange (PBX) switching system, and/or any other terminating piece of customer equipment capable of accessing the AIN 20. In general, the network devices of the AIN 20 may include any type of computer, server, component, machine, tool, equipment, and/or combination thereof capable of operating as described below.

In one embodiment, the AIN 20 includes an intermediate network 230 and a gateway 240. The intermediate network 230 may be configured to enable communication between and among network elements of the AIN 20, such as the SCP 210, the SMS 214, and/or the gateway 240. The intermediate network 230 may include and/or form part of a proprietary network such as a Central Office Wide Area Network (COWAN). The intermediate network 230 may also include or form part of an information delivery system such as a telephone network (e.g., analog, digital, wired, wireless, PSTN, ISDN, or xDSL), a radio network, a television network, a cable network, a satellite network, and/or any other communications network configured to carry data. Each network may include one or more elements such as, for example, intermediate nodes, proxy servers, routers, switches, adapters, and wired or wireless data pathways, configured to direct and/or deliver data.

In some implementations, the intermediate network 230 may include, for example, Mobitex® technology of the Cingular Interactive Intelligent Wireless Network service provided by Cingular Wireless. Aspects of the Mobitex® network may include a two-way wireless data service capable of connecting to other complimentary networks. A wireless data service such as the Mobitex® network includes a hierarchy of communications systems that can provide nationwide wireless service through a network of base stations and local switches under the control of higher order regional switches or exchanges.

As shown in the embodiment of FIG. 2, the AIN 20 includes a gateway 240 in communication with the intermediate network 230, the client 10, and the Internet 30. The gateway 240 may be configured from a standard Santa Cruz Operation (SCO) UNIX system running an Internet-accessible operating system such as Windows NT by Microsoft. The system may use communications protocols (e.g., TCP/IP, UDP, WAP) and markup languages (e.g., HTML, VXML) to support browser applications, including those provided by Netscape and Microsoft. The computer language used by the gateway 240 may be, for example, in the C programming language, Java or HTML.

In general, the gateway 240 may be configured to transfer message within the AIN 20 and among interconnected networks (e.g., intermediate network 230). In some implementations, the gateway 240 may perform protocol conversions that are necessary to enable communications through the intermediate network 230. For example, the gateway 240 may carry out protocol conversion between a mobile communications protocol (e.g., WAP) employed by a wireless device and an Internet communication protocol (e.g., HTTP, TCP/IP) employed by the intermediate network 230. Such protocol conversion may involve routing messages through a network gateway processor that transforms messages from a foreign protocol to a native protocol.

The gateway 240 also may perform content encoding, such as the encoding of wireless markup language (WML) into binary format, and compilation of WMLScripts. Additionally, the gateway 240 may manage the flow of data and the volume of communications traffic over the AIN 20, by limiting the bandwidth size of data packets, for example, in order to preserve the integrity of the AIN 20.

In general, the gateway may support a variety of telecommunications and/or data services including Internet and/or Web services and interactive messaging services. Providing Internet and/or Web services may involve enabling access by computer systems running client programs to electronic documents stored in computer systems running server programs. For example, information on the Web typically is provided by Web servers and is accessible by a client program such as a Web browser (e.g., Netscape's Navigator, Microsoft's Internet Explorer, Java's microbrowser). Web browsers and other client programs may use a communications protocol such as Hypertext Transfer Protocol ("HTTP") to request electronic documents from Web servers.

Providing interactive messaging services may include, for example, enabling users to send, receive, and forward text messages, voice messages, e-mail messages, and/or facsimile messages. In particular, mobile-to-mobile text messaging allows a sender to create and transmit text messages using the mobile number of a recipient. E-mail messaging allows a sender to address e-mail messages using the mobile number of a recipient. Web messaging allows users to send personalized text messages from a public Web site. Users may subscribe to information services and receive alerts concerning news, stock quotes, sports scores, entertainment, or other information displayed on a digital mobile phone. Users may send and receive numeric and/or alphanumeric pages; send and retrieve voicemail messages; and send, receive, forward, and/or print out faxes using a digital phone and a fax machine. Interactive voice response ("IVR") services process remote touch-tone entries from users to query a database and obtain computerized voice responses. Text-to-speech services allow users having only telephone access to convert text messages into audio format.

The AIN 20 depicted in FIG. 2 further includes a SSP switch 202, a STP 206, a SCP 210, a database 212, a SMS 214, a SCE 216, a SN 218, an ADMIN server 220, and a SOAC 222. Such elements generally may be structured and arranged as described above in conjunction with FIG. 1. It is to be understood, however, that other implementations of the AIN 20 shown in FIG. 2 may include additional network elements.

Figure 3:
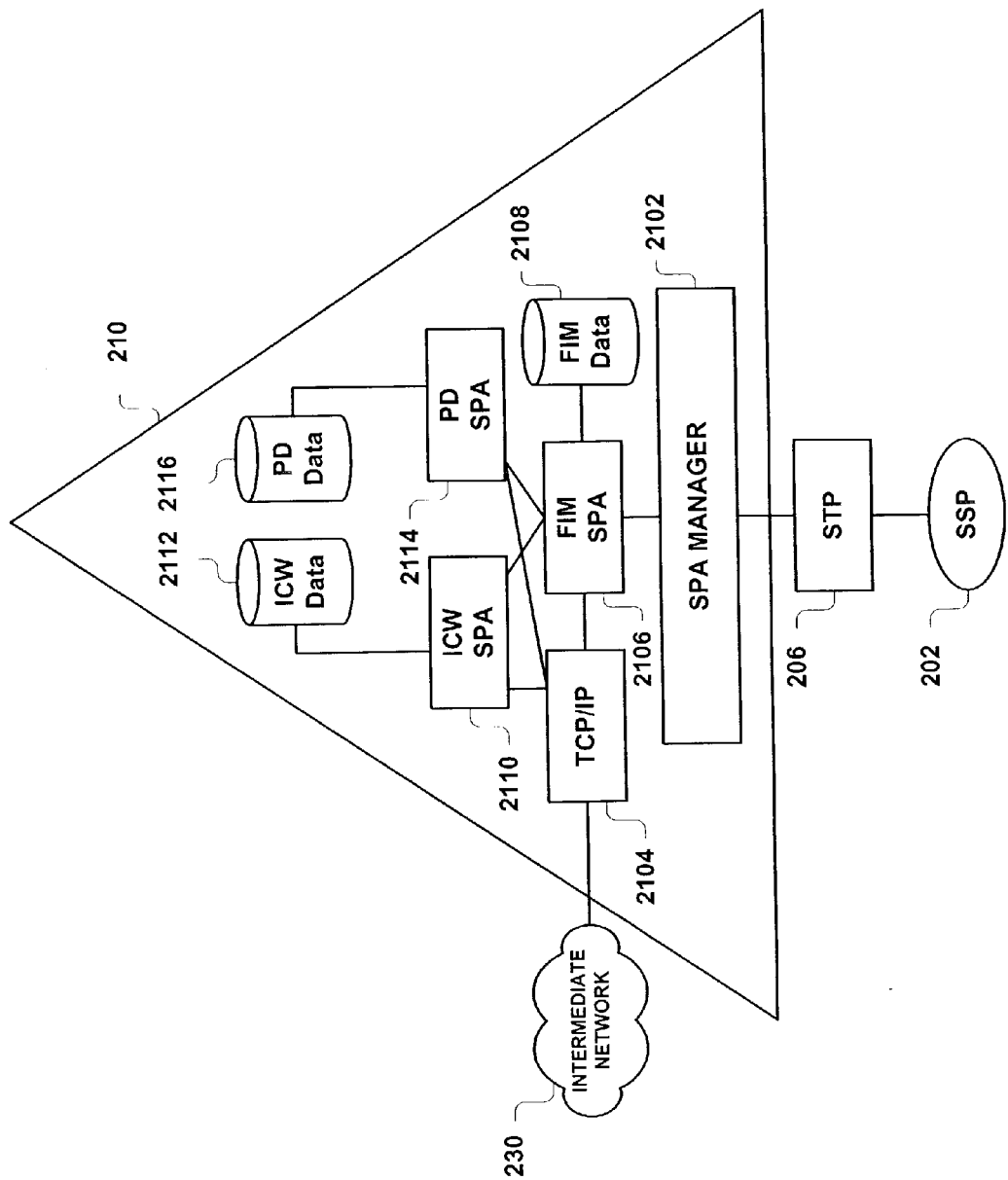
FIG. 3 illustrates one embodiment of a service control point according to aspects of the present invention.

FIG. 3 illustrates one embodiment of a SCP 210 that may be utilized by the AIN 20 in accordance with aspects of the present invention. In this embodiment, the SCP 210 includes a SPA manager 2102 in communication with a SSP 202 through a STP 206. In general, the SPA manager 2102 is configured to receive a query generated by a trigger (e.g., TAT) from the SSP 202 through the STP 206.

The SCP 210 further includes a TCP/IP interface 2104 in communication with an intermediate network 230 (e.g., COWAN) and a Feature Interaction Manager (FIW) SPA 2106. The TCP/IP interface 2104 generally may be configured to receive TCP/IP requests from customers through the intermediate network 230, the gateway 240, and the Internet 30 and direct such requests to the FIM SPA 2106. In one implementation, a TCP/IP request may include a command to manipulate certain features and/or services associated with a particular customer.

In response to the request, the FIM SPA 2106 may interrogate an associated FIM database 2108 to determine whether a particular customer has subscribed to the FIM service. If the FIM database 2108 includes an entry for the particular customer, the FIM database provides a subscriber call management profile associated with the particular customer to the FIM SPA 2106. The FIM SPA 2106 then may deliver the profile to the customer as an Internet (e.g., Web, HTML, XML) interface document, for example.

As described above, the subscriber call management profile may identify one or more features and/or services associated with the customer. In the embodiment of FIG. 3, for example, the customer may be provided with an ICW service through an ICW SPA 2110 and an associated ICW database 2112 and may be provided with a privacy director (PD) service through a PD SPA 2114 and an associated PD database 2116. In general, the ICW SPA may be configured to instruct the SSP 202 to provide ICW services for customers that are identified in the ICW database 2112. Similarly, the PD SPA 2114 may be configured to instruct the SSP 202 to provide PD services for customers that are identified in the PD database 2116. Accordingly, in this embodiment, the subscriber call management profile may list at least the ICW service and the PD service as being available to the customer.

By using an Internet (e.g., Web) interface such as an Internet-enabled device having browsing software, the customer may manipulate the subscriber call management profile to allow multiple services per trigger type. In one implementation, the customer may specify a logical sequence for available services. For example, the customer may specify that the ICW service takes priority over and is to be provided before the PD service. According to this implementation, the FIM SPA 2106 may receive a query for FIM service generated from a trigger (e.g., TAT) from the SPA manager 2102. In response, the FIM SPA 2106 may interrogate the FIM database 2108 and confirm that the particular customer has subscribed to the FIM service. If confirmation is received, the FIM SPA 2106 may instruct the ICW SPA 2110 and the PD SPA 2114 to provides the ICW service and PD service according to the logical sequence specified in the subscriber call management profile. For instance, the ICW SPA 2110 may query the SSP 202 to determine if the customer is currently accessing the Internet. If the customer is accessing the Internet, the ICW SPA 2110 may instruct the SSP 202 to provide ICW services to the customer. If, however, the customer is not accessing the Internet, the ICW SPA 2110 informs the FIM SPA 2106 and/or the PD SPA 2114 of this condition. As a result, the PD SPA 2114 is engaged and instructs the SSP 202 to provide PD services to the customer.

In another implementation, the customer may specify certain times for providing available services. For example, the customer may specify that the ICW service is to be provided only during a certain time period and that the PD service is to be provided at all other times. In general, available services will be provided on an either-or basis. According to this implementation, the FIM SPA 2106 may receive a query for FIM service generated from a trigger (e.g., TAT) from the SPA manager 2102. In response, the FIM SPA 2106 may interrogate the FIM database 2108 and confirm that the particular customer has subscribed to the FIM service. If confirmation is received, the FIM SPA 2106 may instruct the ICW SPA 2110 and the PD SPA 2114 to provide the ICW service and the PD service according to the certain times specified in the subscriber call management profile. For instance, if the FIM SPA 2106 receives a query generated from a trigger (e.g., TAT) during the certain time specified for providing the ICW service, the FIM SPA 2106 may command the ICW SPA 2110 to instruct the SSP 202 to provide ICW services to the customer. In contrast, if the FIM SPA 2106 receives a query generated from a trigger (e.g., TAT) during the certain time specified for providing the PD service, the FIM SPA 2106 may command the PD SPA 2114 to instruct the SSP 202 to provide PD services to the customer.

Figure 4:
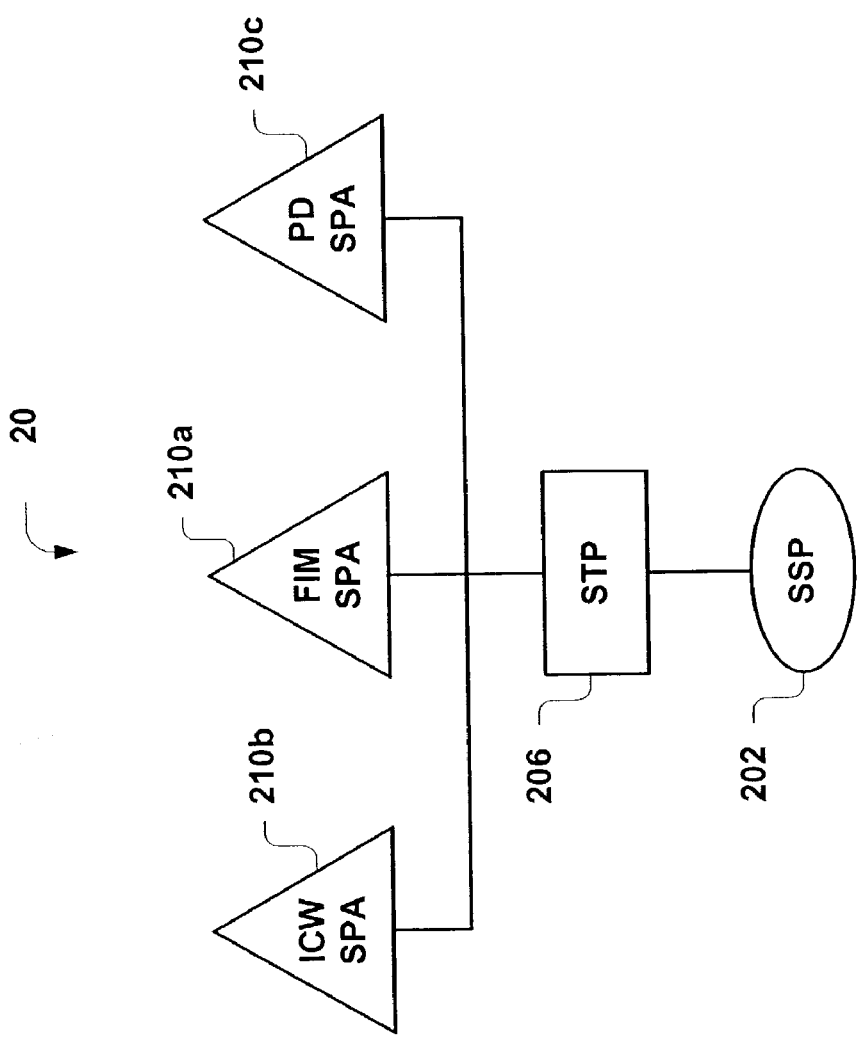
FIG. 4 illustrates one embodiment of an advanced intelligent network according to aspects of the present invention.

FIG. 4 illustrates one embodiment of an AIN 20 including a plurality of SCPs (i.e., a first SCP 210a, a second SCP 210b, and a third SCP 210c). Each of the SCPs may be located in proximity to the other SCPs and/or located remotely (i.e., in different cities) from the other SCPs. According to this embodiment, each of the SCPs may be configured to provide a separate enhance call feature or service. For example, in the embodiment of FIG. 4, the first SCP 210a may be configured to provide a FIM service, the second SCP 210b may be configured to provide an ICW service, and the third SCP 210c may be configure to provide a PD service. The SCPs 210a, 210b, 210c may be in communication with a SSP 202 through a STP 206.

In one implementation, the FIM SPA of the first SCP 210a may be configured to receive TCP/IP requests from customers and direct such requests to the FIM SPA. The TCP/IP request may include a command to manipulate certain features and/or services associated with a particular customer. In response to the request, the FIM SPA may interrogate an associated FIM database (not shown) to determine whether a particular customer has subscribed to the FIM service. If the FIM database includes an entry for the particular customer, the FIM database provides a subscriber call management profile associated with the particular customer to the FIM SPA. The FIM SPA then may deliver the profile to the customer as an Internet (e.g., Web, HTML, XML) interface document, for example.

By using an Internet (e.g., Web) interface such as an Internet-enabled device having browsing software, the customer may manipulate the subscriber call management profile to allow multiple services per trigger type, as described above. For example, the customer may specify a logical sequence for available services or certain times for providing available services. Accordingly, the FIM SPA of the first SCP 210a may instruct the ICW SPA of the second SCP 210b and the PD SPA of the third SCP 210c to provides the ICW service and PD service according to the logical sequence specified in the subscriber call management profile or according to the certain times specified in the subscriber call management profile.

Figure 5:
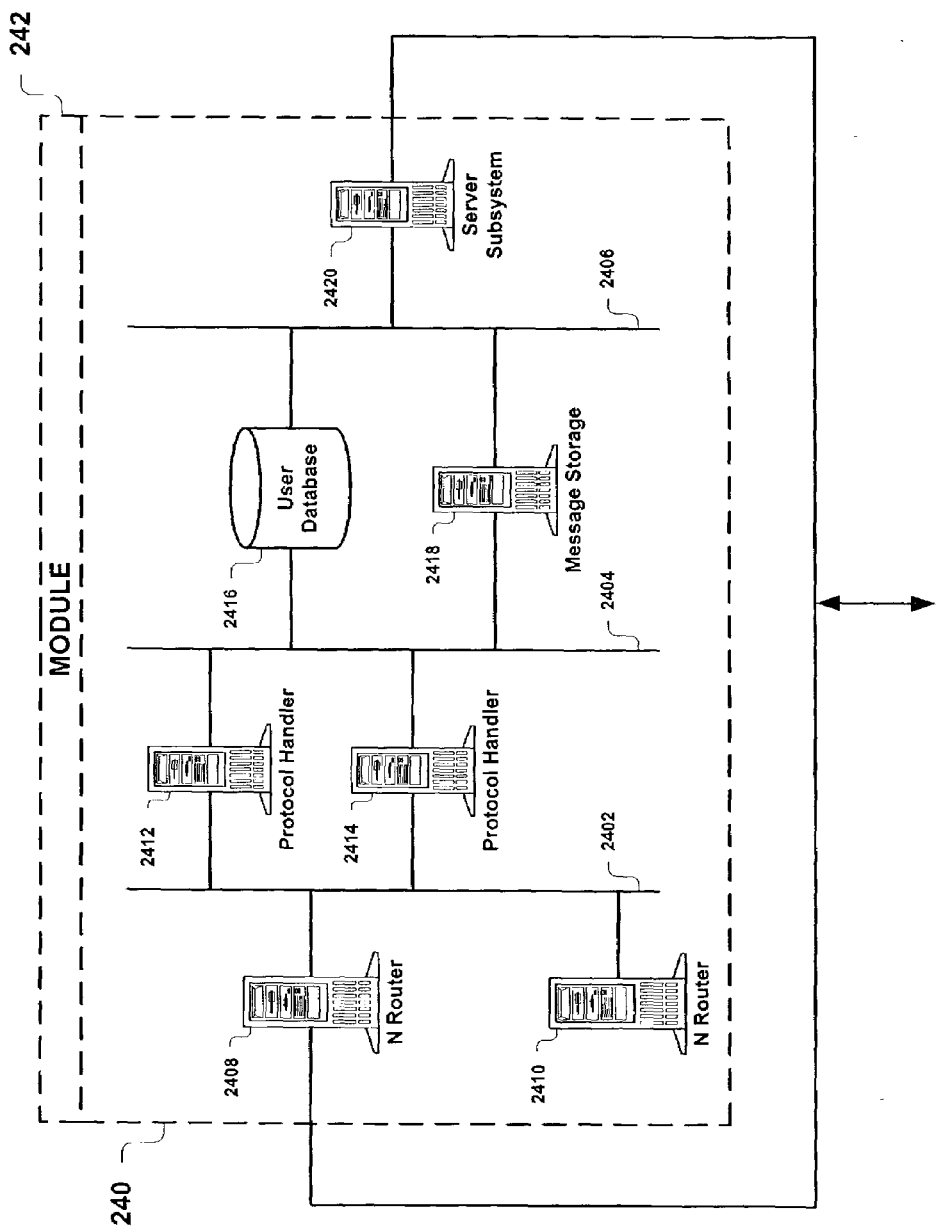
FIG. 5 illustrates one embodiment of a gateway according to aspects of the present invention.

FIG. 5 illustrates one embodiment of a gateway 240 that may be utilized to by the AIN 20 in accordance with aspects of the present invention. In this embodiment, the communications system 100 includes a network 20 having a gateway 240. The gateway 240 may operate under the direction of a gateway control module 242 (e.g., software code) installed on one or more devices of the gateway 240 and may communicate with the client 10, other elements of the AIN 20, and/or Internet 30.

In one implementation, the gateway 240 includes one or more internal networks 2402, 2404, and 2406, such as local area networks (LANs), configured to interconnect various elements of the gateway 240. For example, the internal networks 2402, 2404, and 2406 may interconnect components including Nrouters 2408 and 2410, protocol handlers 2412 and 2414, a user database 2416, a message storage server, 2418, and a server subsystem 2420.

At the gateway 240, the Nrouters 2408 and 2410 communicate with one or more regional switches residing at remote locations. The communication between the regional switches and the Nrouters 2408, 2410 may use, for example, X.25 and/or TCP/IP protocols. Generally, the Nrouters 2408 and 2410 are configured to route and deliver messages various elements within the AIN 20. Each of the Nrouters 2408 and 2410 may include one or more dual-ported connectivity cards, for example, those provided by Eicon Networks, so that each Nrouter may support multiple Fast-Sequenced Transport (FST) connections. In one implementation, the gateway 240 can handle up to 255 Nrouters.

The Nrouters 2408 and 2410 may communicate with protocol handlers 2412, 2414 over an internal network 2402 using, for example, X-sockets. In general, the protocol handlers 2412 and 2414 are configured to provide support for any customized protocols (e.g., application-specific protocols) necessary to access customized objects. For example, if a particular object is supported by a protocol other than a standard communication protocol (e.g., HTTP, TCP/IP), the protocol handlers 2412 and 2414 may use a specified application protocol to retrieve and access the particular object. In one implementation, the protocols handled by protocol handlers 2412, 2414 may specify that message storage and internal e-mail access may be handled by the UNIX standard Network File System (NFS) distributed file system from SUNSOFT, which allows data to be shared across the network regardless of the protocol. Each protocol handler 2412 and 2414 also may maintain a database cache (not shown) configured to maintain recently accessed data in order to increase the speed of internal network communications and to limit database access requests over the internal networks 2402, 2404 and 2406.

Additionally, the protocol handlers 2412, 2414 may process information contained in user database machines, such as user database 2416. The protocol handlers 2412, 2414 may use data from the user database 2416 to communicate with other systems or networks external to the gateway 240. Generally, the user database 2416 contains an interface to content addressable memory (CAM) (not shown) for updating information, e.g., user account information and status. Each user associated with the wireless communications system 100 may have an account maintained in the user database 2416 including a unique identifier, such as a MOBITEX® access number, for example. Information maintained in the user database 2416 may be used to validate users, monitor usage, and maintain billing information.

The gateway 240 also may include a message storage server 2418 configured to store and forward messages (e.g., e-mail, voicemail, fax, data) intended for one or more recipients. The intended recipient may be a user of the AIN 20 that has subscribed to receive one or more interactive messaging features. The message storage server 2418 may include a system of folders configured to store interactive messaging content associated with subscribers. Interactive messaging provides, for example, a way of communicating with the ability of sending, receiving, and forwarding text messages, voice message, e-mail messages, and/or facsimile messages. The message storage server 2418 may store various content associated with interactive messaging and allow users to retrieve and manage such content.

The message storage server 2418 also may contain various routing and delivery program modules configured to deliver messages to a recipient or to an intermediate component for subsequent delivery to a recipient. One or more backup databases or servers may be used in the gateway 240, each backup database being synched automatically by sockets communications.

As shown in FIG. 5, the gateway 240 includes a server subsystem 2420. Generally, the server subsystem 2420 is configured to provide interactive communications services such as, for example, messaging services, information services, paging services, voicemail services, facsimile services, interactive voice response (IVR) services, and text-to-speech services.

Figure 6:
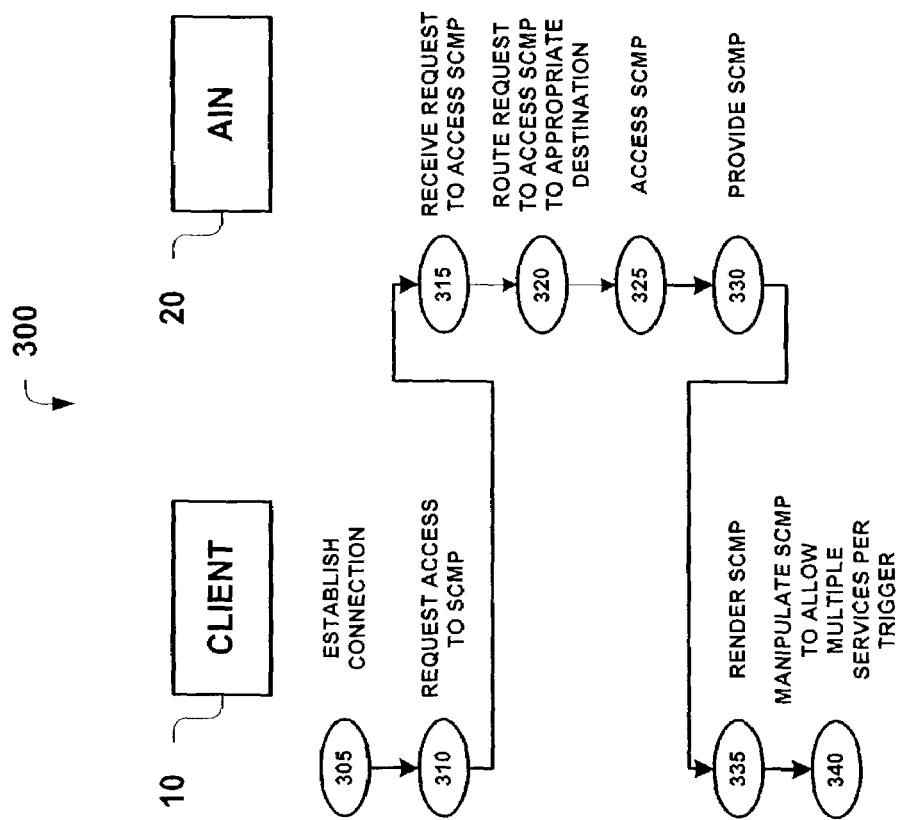
FIG. 6 is one embodiment of a communications method according to aspects of the present invention.

Referring to FIG. 6, aspects of the present invention include a procedure 300 for managing a subscriber call management profile. The procedure 300 may be implemented by any suitable type of hardware (e.g., device, computer, computer system, equipment, component); software (e.g., program, application, instructions, code); storage medium (e.g., disk, external memory, internal memory, propagated signal); or combination thereof.

In one implementation, a client 10 and an AIN 20 interact according to the procedure 300. In general, the client 10 and the AIN 20 may be structured and arranged as shown in any one of FIGS. 1-5 and/or to any other configuration consistent with aspects of the present invention.

The procedure 300 begins when a customer uses the client 10 to establish a connection to the AIN 20 (step 305) and request access to a subscriber call management profile (310). According to one embodiment, the customer may use a client 10 such as a wireless telephone and/or a landline telephone, for example, to connect to the AIN 20 and request access to a subscriber call management profile through a telephone interface. For example, the customer may dial a certain administration telephone number dedicated for accessing the subscriber call management profile.

In another embodiment, the customer may use a client 10 (e.g., Internet-enabled device) to establish a connection to the AIN 20. In some implementations of this embodiment, the client 10 dials an Internet access number and establishes a connection to a particular network address (e.g., URL, IP address) of the AIN 20 through the Internet 30.

The AIN 20 receives the request to access a subscriber call management profile (step 315) and then routes the request to an appropriate destination (step 320). According to one embodiment, the AIN 20 receives the request for access as a call placed to an administration telephone number. In response to the call placed to the administrative number, the SSP 202 implements an originating trigger and generates a query. The query may be formatted, for example, according to SS7 TCAP (Transaction Capabilities Application Part) formats. The query may include an origination point code identifying the customer (i.e., calling party) based on the telephone number associated with the wireless and/or landline telephone used to place the call. The query also may include a destination point code identifying the location (e.g., network address) of the SCP 210. The destination point also may identify a particular function (e.g., FIM SPA) running on the SCP 210 for managing subscriber call management profiles.

In some implementations of this embodiment, the first SSP 202 may send the query to the second SSP 204. For example, the second SSP 204 may be dedicated for processing requests to access a subscriber call management profile. In such cases, the query generated by the first SSP 202 may include a destination point identifying the location (e.g., network address) of the second SSP 204. The SSP 204 may receive the query and then send the query through the second STP 208, which also may be dedicated for processing request to access a subscriber call management profile. The second STP 208 then may send the query to the SCP 210 for further processing.

According to another embodiment, the AIN 20 may receive the request for access to a subscriber call management profile from an Internet-enabled device. In some implementations of this embodiment, the AIN 20 may receive the request for access in connection with a dialed Internet access number. In some cases, a customer may be presented with a user interface after connecting to a Web-server associated with the access number. The user interface may prompt the customer to enter a telephone number for identifying the customer as well as authorization information such as a user ID and password, for example. While connected to the Internet 30, the customer may use the Internet-enabled device to route a request for access to a subscriber call management profile through the Internet 30, the gateway 240, and the intermediate network 230 to the SCP 210.

In response to the received request, the AIN 20 accesses a particular subscriber call management profile (step 325) and provides the accessed subscriber call management profile to the client 10 (step 330). According to one embodiment, the SCP 210 may receive a query generated from trigger. The query may include an originating point code identifying a particular customer that is requesting access to a subscriber call management profile by a telephone number, for example. The SCP 210 may interrogate the database 212 and retrieve a subscriber call management profile corresponding to the identified customer. The SCP 210 may provide the accessed subscriber call management to the client 10 by routing a voice-interface document through the STP 208, the second SSP 204, and the first SSP 202.

According to another embodiment, the SCP 210 may include an intelligent server accessible through an intermediate network 230, a gateway 240, and/or the Internet 30. In some implementations, the intelligent server of the SCP 210 may receive a TCP/IP request and, in turn, interrogate the database 212. The intelligent server of the SCP 210 may identify a particular customer according to an entered telephone number and retrieve a corresponding subscriber call management profile from the database 212. The intelligent server of the SCP 210 may provide the accessed subscriber call management to the client 10 by routing an Internet (e.g., Web, HTML, XML) interface document through the intermediate network 230, the gateway 240, and the Internet 30.

The client 10 renders the subscriber call management profile (step 335) and manipulates the subscriber call management profile to allow multiple services per trigger type (step 340). According to one embodiment, a customer may render the subscriber call management profile through a voice interface, such as a wireless or landline telephone. In such cases, a voice interface document containing the subscriber call management profile may be presented in an audio format. The customer may manipulate the subscriber call management profile by inputting data through the voice interface. For example, the customer may use voice commands and/or dialing commands to manipulate subscriber call management profile as desired.

According to another embodiment, a customer may render the call management profile through an Internet (e.g., Web) interface such as an Internet-enabled device including browsing software. In such cases, an Internet (e.g., Web, HTML, XML) interface document containing the subscriber call management profile may be presented in a viewable format.

The Internet (e.g., Web) interface may present the document as visual outline of the subscriber call management profile and provide the customer with the ability to manipulate the subscriber call management profile as desired. For example, the subscriber may use browser commands such as key stokes and/or mouse clicks to make modifications to the subscriber call management profile.

In one implementation, manipulating the subscriber call management profile may involve specifying a logical sequence for available services. For example, the customer may specify that the ICW service takes priority over and is to be provided before the PD service. According to this implementation, the AIN 20 may receive a query generated from a trigger (e.g., TAT) and may provides the ICW service and PD service according to the logical sequence specified in the subscriber call management profile. For instance, the AIN 20 may determine if the customer is currently accessing the Internet. If the customer is accessing the Internet, the AIN 20 may provide the ICW service to the customer. If, however, the customer is not accessing the Internet, the AIN 20 may provide the PD service to the customer.

In another implementation, manipulating the subscriber call management profile may involve specifying certain times for providing available services. For example, the customer may specify that the ICW service is to be provided only during a certain time period and that the PD service is to be provided at all other times. In general, available services will be provided on an either-or basis. According to this implementation, the AIN 20 may receive a query generated from a trigger (e.g., TAT) and may provide the ICW service and the PD service according to the certain times specified in the subscriber call management profile. For instance, if the AIN 20 receives a query generated from a trigger (e.g., TAT) during the certain time specified for providing the ICW service, the AIN 20 provide the ICW service to the customer. In contrast, if the AIN 20 receives a query generated from a trigger (e.g., TAT) during the certain time specified for providing the PD service, the AIN 20 may provide PD services to the customer.

In some cases, manipulating the subscriber call management profile also may involve adding and/or removing certain features and/or services. For example, using the voice interface and/or the Internet (e.g., Web) interface, the customer may activate or deactivate certain calling features, such as (FCF), caller ID), call screening and blocking for both incoming and outgoing calls, privacy director (PD), do not disturb (DND), remote event notification, call waiting, Internet call waiting (ICW), and/or any other type of call processing service and/or feature.

A number of implementations have been described. Nevertheless, it will be understood that various modifications may be made and that other implementations are within the scope of the following claims.

What is claimed is:

1. A communications method for managing multiple call processing services, comprising:
    establishing a connection to a service control point via a gateway, the service control point comprising:
        one or more intelligent servers the one or more intelligent servers executing one or more service program applications;
        a feature interaction manager (FIM) service program application (SPA) in communication with a FIM database and further in communication with the one or more service program applications;
    rendering a call management profile to a customer, the call management profile being maintained by the FIM SPA, in substantially real time using a Web-enabled interface via the gateway, the call management profile indicating two or more call processing services currently available to a customer in response to a single trigger, the single trigger comprising a terminating trigger for processing calls terminating at a customer premises and wherein the two or more call processing services are assigned to the single trigger, wherein available call processing services include at least two of a call forwarding service, a caller identification service, a call screening and blocking service, a privacy service, a do not disturb service, a remote event notification service, a call waiting service, and an Internet call waiting service;
    interconnecting via internal networks of gateway:
        one or more Nrouters, the Nrouters for communicating with one or more or more remote switches and including a dual-ported connectivity card,
        a user database user database containing information to validate users, monitor usage and maintain billing information;
        one or more protocol handlers in communication with the Nrouters, the protocol handlers providing customized protocol translation and processing information within the user database for communication to external systems via the Nrouters;
        a server subsystem for providing interactive communication services including messaging services; and
    manipulating the call management profile by specifying a sequence for prioritizing the two or more call processing services in response to the single trigger, wherein the sequence for prioritizing the two or more call processing services comprises a logical sequence for providing a call processing service, wherein the logical sequence is based on a determination as to whether the customer is currently accessing a communications service related to at least one of the two or more call processing services, and wherein the communications service comprises the Internet and the at least one of the two or more call processing services comprises Internet call waiting.

2. The communications method of claim 1, wherein the connection is established over a TCP/IP link.

3. The communications method of claim 1, wherein the connection is established over a wide area network.

4. The communications method of claim 3, wherein the wide area network comprises the Internet.

5. The communications method of claim 3, wherein the wide area network comprises a central office.

6. The communications method of claim 1, wherein the Web-enabled interface comprises a personal computer.

7. The communications method of claim 1, wherein the Web-enabled interface comprises browsing software.

8. The communications method of claim 1, wherein the Web-enabled interface comprises a wireless telecommunications device.

9. The communications method of claim 1, wherein rendering the call management profile comprises viewing a Web page.

10. The communications method of claim 1, wherein manipulating the call management profile comprises inputting browser commands.

* * * * *